(12) United States Patent
Koike et al.

(10) Patent No.: US 8,795,765 B2
(45) Date of Patent: Aug. 5, 2014

(54) METHOD FOR PRODUCING A PERPENDICULAR MAGNETIC RECORDING MEDIUM

(75) Inventors: Takashi Koike, Tokyo (JP); Shigeaki Furugori, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 118 days.

(21) Appl. No.: 13/322,520

(22) PCT Filed: May 22, 2010

(86) PCT No.: PCT/JP2010/058678
§ 371 (c)(1),
(2), (4) Date: Feb. 13, 2012

(87) PCT Pub. No.: WO2010/137534
PCT Pub. Date: Dec. 2, 2010

(65) Prior Publication Data
US 2012/0171369 A1 Jul. 5, 2012

(30) Foreign Application Priority Data
May 24, 2009 (JP) ................. 2009-124786

(51) Int. Cl.
*G11B 5/738* (2006.01)
*G11B 5/73* (2006.01)
(52) U.S. Cl.
CPC .................. *G11B 5/7325* (2013.01); *G11B 5/738* (2013.01)
USPC ....................................... 427/131
(58) Field of Classification Search
None
See application file for complete search history.

(56) References Cited

U.S. PATENT DOCUMENTS

| | | | |
|---|---|---|---|
| 6,468,670 B1 | 10/2002 | Ikeda et al. | |
| 2005/0058854 A1* | 3/2005 | Takekuma et al. | 428/694 TM |
| 2006/0014052 A1 | 1/2006 | Watanabe et al. | |
| 2006/0057431 A1* | 3/2006 | Tamai et al. | 428/836.2 |
| 2006/0088737 A1 | 4/2006 | Hirayama et al. | |
| 2008/0113221 A1 | 5/2008 | Hirayama et al. | |
| 2008/0130172 A1* | 6/2008 | Gouke | 360/131 |

FOREIGN PATENT DOCUMENTS

| | | |
|---|---|---|
| JP | 2002-092865 | 3/2002 |
| JP | 2005-108268 A | 4/2005 |
| JP | 2006-048904 A | 2/2006 |
| JP | 2006-085742 A | 3/2006 |
| JP | 2006-120290 A | 5/2006 |
| JP | 2008-123626 A | 5/2008 |
| JP | 2008-140436 A | 6/2008 |
| JP | 2009-157956 A | 7/2009 |

* cited by examiner

*Primary Examiner* — Mandy Louie

(57) ABSTRACT

To provide a method for manufacturing a perpendicular magnetic recording medium, which is capable of coping with the much higher recording density.
Disclosed is a method for manufacturing a perpendicular magnetic recording medium to be used for recording information by a perpendicular magnetic recording system, including at least a soft magnetic layer, an intermediate layer, and a magnetic recording layer on a substrate, characterized in that the method includes the step of:
composing the intermediate layer of consecutive N layers (provided that N is an integer of at least 3 or more), depositing a first layer containing ruthenium (Ru) as a main component, first; setting a gas pressure during the deposition to the pressure which is higher than or the same as that in the first layer; depositing a second layer containing ruthenium (Ru), or ruthenium (Ru) containing oxygen or an oxide as a main component; and adjusting so that the oxygen content remains constant, or increases toward the uppermost layer in the second layer and succeeding layers.

7 Claims, 1 Drawing Sheet

METHOD FOR PRODUCING A PERPENDICULAR MAGNETIC RECORDING MEDIUM

BACKGROUND OF THE INVENTION

1. Technical Field

The present invention relates to a method for manufacturing a perpendicular magnetic recording medium to be mounted on a magnetic disk device of a perpendicular magnetic recording system, such as a hard disk drive (HDD).

2. Background Art

With increasing capacity for information processing, various types of information recording techniques have been recently developed. In particular, the HDD using a magnetic recording technique has been continuing to increase a surface recording density at a rate of about 100% per year. In recent years, magnetic disks of 2.5 inches in diameter for use in the HDD or the like have been required to have an information recording capacity exceeding 250 Gbyte per piece. An information recording density exceeding 400 Gbit per square inch is required so as to achieve such a requirement. In order to achieve the high recording density in the magnetic disk to be used in the HDD or the like, it is necessary to miniaturize magnetic crystal particles included in a magnetic recording layer for recording information signals, and to decrease the thickness of the magnetic recording layer. However, in a magnetic disk for an in-plane magnetic recording system (which is also referred to as a longitudinal magnetic recording system, or a horizontal magnetic recording system) commercialized in the related art, progress in reducing the size of the magnetic crystal particles would result in degradation of the thermal stability of the recording signals due to a superparamagnetic phenomenon. This generates a thermal fluctuation phenomenon causing the recording signal to disappear, which interrupts an increase in recording density of the magnetic disk.

In order to solve such a cause for interruption, magnetic disks for the perpendicular magnetic recording system have been recently proposed. Unlike the in-plane magnetic recording system, in the case of the perpendicular magnetic recording system, the magnetization easy axis of the magnetic recording layer is adjusted to be directed perpendicularly with respect to the surface of the substrate. The perpendicular magnetic recording system can suppress the thermal fluctuation phenomenon as compared to the in-plane magnetic recording system, and hence is suitable for achieving the higher recording density. For example, Japanese Unexamined Patent Publication No. 2002-92865 discloses a technique regarding a perpendicular magnetic recording medium including a soft magnetic layer, an under layer, a Co-based perpendicular magnetic recording layer, a protective layer, and the like which are formed on a substrate in that order. Further, U.S. Pat. No. 6,468,670 specification discloses a perpendicular magnetic recording medium which has a structure with a continuous layer of an artificial lattice film (exchange coupled layer) exchange-coupled to a particulate recording layer.

Currently, the perpendicular magnetic recording media have been required to have a higher recording density.

The perpendicular magnetic recording medium includes, as main components, a magnetic recording layer formed of hard magnetic material, a soft magnetic (backing) layer formed of soft magnetic material, and an intermediate layer formed of non-magnetic material positioned between the magnetic recording layer and the soft magnetic layer.

Among these layers, the intermediate layer is located under the magnetic recording layer and is a portion serving to control a crystal orientation of the magnetic recording layer and the isolation of a granular structure. In short, the intermediate layer is a very important part as it serves as a base for the magnetic recording layer. Thus, the structure, material, and deposition process of the perpendicular magnetic recording media, and the like have been strenuously studied and developed. As a result, the intermediate layer is divided into a seed layer positioned on the lower side and an intermediate layer (generally also referred to as an underlayer) positioned on the upper side. The intermediate layer (underlayer) includes a lamination of a lower intermediate layer deposited at a low gas pressure, and an upper intermediate layer deposited at a high gas pressure, using the same material. In particular, the upper intermediate layer deposited at the high gas pressure is positioned directly under the granular magnetic recording layer, and thus is a very important part from the viewpoint of controlling magnetic characteristics.

CITATION LIST

Patent Literature

Patent Literature 1: Japanese Unexamined Patent Publication No. 2002-92865
Patent Literature 2: U.S. Pat. No. 6,468,670 specification The present inventors have made progress in study and found that the simple laminated structure composed of the lower intermediate layer deposited at the low gas pressure, and the upper intermediate layer deposited at the high gas pressure in the related art cannot provide desired electromagnetic conversion characteristics for a magnetic recording medium having a higher recording density.

The lower intermediate layer deposited at a low gas pressure mainly contributes to control of orientation of a magnetic recording layer, while the upper intermediate layer deposited at a high gas pressure mainly contributes to control of separation properties of magnetic particles of a magnetic recording layer. In order to realize the much higher recording density in a perpendicular magnetic recording medium, it is important to control crystal orientation and separation properties of these intermediate layers which correspond to the lower layer of the magnetic recording layer.

As can be seen from the consideration made by the present inventors, for example, it is necessary to deposit at a high gas pressure so as to promote separation properties in the upper intermediate layer of Ru. Separation properties are improved when the layer further contains oxygen or an oxide such as $SiO_2$. However, the simple two-layered film composed of an Ru layer deposited at a low gas pressure and an oxygen- or oxide-containing Ru layer deposited at a high gas pressure, for example, is inferior in integrity because of poor connection between layers. In particular, an improvement in separation properties of the upper layer having large oxygen content is expected. However, integrity with the lower layer becomes worse. Thus, it is considered that the upper layer also affects the granular structure of the magnetic recording layer located directly above the upper underlayer, which results in degradation of recording and reproducing characteristics.

SUMMARY OF THE INVENTION

Under the conventional circumstances, an object of the present invention is to provide a method for manufacturing a perpendicular magnetic recording medium, which is capable of coping with the much higher recording density.

The present inventors have intensively studied so as to solve the above conventional problems and found that separation properties are further improved by composing an intermediate layer of at least consecutive three layers and appropriately adjusting the oxygen content of each layer, and also crystal orientation is improved by making integrity of the entire consecutive intermediate layers satisfactory, whereby, magnetic characteristics as well as recording and reproducing characteristics of the magnetic recording layer can be further improved. As a result, the present invention has been completed. That is, the present invention has the following constructions so as to achieve the above object.

Fist Construction

A method for manufacturing a perpendicular magnetic recording medium to be used for recording information by a perpendicular magnetic recording system, including at least a soft magnetic layer, an intermediate layer, and a magnetic recording layer on a substrate, characterized in that the method comprises the step of:

composing the intermediate layer of consecutive N layers (provided that N is an integer of at least 3 or more); depositing a first layer containing ruthenium (Ru) as a main component, first; setting a gas pressure during the deposition to the pressure which is higher than or the same as that in the first layer; depositing a second layer containing ruthenium (Ru), or ruthenium (Ru) containing oxygen or an oxide as a main component; and adjusting so that the oxygen content remains constant, or increases toward the uppermost layer in the second layer and succeeding layers.

Second Construction

In the method for manufacturing a perpendicular magnetic recording medium according to the first construction, the intermediate layer is composed of consecutive N layers (provided that N is an integer of at least 3 or more), the oxygen content of N layers is adjusted within a range from 0 ppm by weight to 20,000 ppm by weight, and the oxygen content of the (N−a+1)th layer (provided that "a" is an integer of 1 to (N−2)) is adjusted so that the oxygen content is the same as or higher than that of the (N−a)th layer.

Third Construction

In the method for manufacturing a perpendicular magnetic recording medium according to the first or second construction, an oxide containing a Si, Ti, Cr, Co, W, Ta, Al, Mg, Fe, Pd, Au, Mo, Zr or Pb material is used as the oxide.

Fourth Construction

In the method for manufacturing a perpendicular magnetic recording medium according to any one of the first to third constructions, a gas pressure of the first layer in the deposition of the intermediate layer is set within a range from 0.3 to 15 Pa, and a gas pressure of succeeding layers is set to a gas pressure which is the same as or higher than that of the first layer.

Fifth Construction

In the method for manufacturing a perpendicular magnetic recording medium according to any one of the first to fourth constructions, the magnetic recording layer includes a ferromagnetic layer having a granular structure which includes crystal particles mainly containing cobalt (Co), and a boundary part mainly containing an oxide.

Sixth Construction

In the method for manufacturing a perpendicular magnetic recording medium according to any one of the first to fifth constructions, a carbon-based protective layer is formed on the magnetic recording layer.

According to the present invention, separation properties are further improved by composing the intermediate layer of consecutive N layers (provided that N is an integer of at least 3 or more); and depositing a first layer containing ruthenium (Ru) as a main component, first; setting a gas pressure during the deposition to the pressure which is higher than or the same as that in the first layer; depositing a second layer containing ruthenium (Ru), or ruthenium (Ru) containing oxygen or an oxide as a main component; and adjusting so that the oxygen content remains constant, or increases toward the uppermost layer in the second layer and succeeding layers, and also crystal orientation is improved by making integrity of the entire consecutive intermediate layers satisfactory, whereby, magnetic characteristics as well as recording and reproducing characteristics of the magnetic recording layer can be further improved. Accordingly, it is possible to obtain a perpendicular magnetic recording medium, which is capable of coping with the much higher recording density.

DETAILED DESCRIPTION OF THE INVENTION

Figures 1, 2:
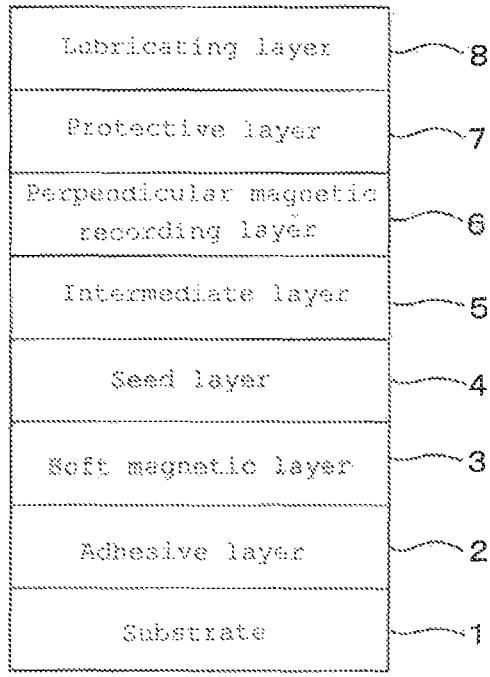
FIG. 1 is a sectional view showing a schematic layer structure of a perpendicular magnetic recording medium of an Example.
FIG. 2 is a view showing one embodiment of an intermediate layer in the present invention.

Embodiments of the present invention will be described in detail below.

According to the first construction of the present invention, there is provided a method for manufacturing a perpendicular magnetic recording medium to be used for recording information by a perpendicular magnetic recording system, including at least a soft magnetic layer, an intermediate layer, and a magnetic recording layer on a substrate, characterized in that the method comprises the step of composing the intermediate layer of consecutive N layers (provided that N is an integer of at least 3 or more); depositing a first layer containing ruthenium (Ru) as a main component, first; setting a gas pressure during the deposition to the pressure which is higher than or the same as that in the first layer; depositing a second layer containing ruthenium (Ru), or ruthenium (Ru) containing oxygen or an oxide as a main component; and adjusting so that the oxygen content remains constant, or increases toward the uppermost layer in the second layer and succeeding layers.

A glass substrate is preferably used as the substrate, although the glass substrate will be described in more detail hereinafter.

Specifically, the layer structure of the perpendicular magnetic recording medium in one embodiment of the present invention is a lamination of, for example, an adhesive layer, a soft magnetic layer, a seed layer, an intermediate layer, a magnetic recording layer (perpendicular magnetic recording layer), a protective layer, a lubricating layer, and the like, which are laminated from the side close to the substrate.

The intermediate layer is used for suitably controlling the crystal orientation (which causes the crystal orientation to be directed perpendicularly with respect to the substrate surface), the crystal grain size, and the grain boundary segregation of the perpendicular magnetic recording layer. The material of the underlayer is preferably an elementary substance or an alloy thereof which has a hexagonal closest packing (hcp) structure. In the present invention, Ru or an alloy thereof is preferably used. Ru is suitable for controlling the crystal axis (c axis) of a CoPt-based perpendicular magnetic recording layer having a hcp crystal structure in the perpendicular direction.

In the present invention, an intermediate layer is formed by the following deposition process. That is, the intermediate layer is composed of consecutive N layers (provided that N is an integer of at least 3 or more).

First, a gas pressure during deposition is set to a low level, and then the first layer containing Ru as a main component is deposited. The main component means a component in which the content of elements other than Ru is less than 10%. In the present invention, it is preferred to use an Ru elementary substance.

A gas pressure during deposition is set to a gas pressure the same as or higher than that of the lower layer (the first layer), and then the second layer and succeeding layers, which contain pure Ru (Ru elementary substance) or Ru and oxygen or an oxide, are deposited. In this case, adjustment is performed so that the oxygen content remains constant, or increases toward the uppermost layer in the second layer and succeeding layers. As those to be contained in the Ru layer, it is possible to suitably use those including oxygen alone, and oxides such as an oxide of Si ($SiO_2$, etc.), an oxide of Ti ($TiO_2$, etc.), an oxide of Cr ($Cr_2O_3$, etc.), an oxide of Co (CoO, $Co_3O_4$, etc.), an oxide of W ($WO_3$, etc.), an oxide of Ta, an oxide of Al, an oxide of Mg, an oxide of Fe, an oxide of Pd, an oxide of Au, an oxide of Mo, an oxide of Zr and an oxide of Pb. For example, it is possible to adjust so that the oxygen content remains constant, or increases toward the uppermost layer in the second layer and succeeding layers, by varying the content of oxygen or oxides of each layer of the second layer and succeeding layers.

It is suitable that the gas pressure during deposition of the intermediate layer of the present invention is set within a range from 0.3 to 15 Pa for the first layer, and the gas pressure during deposition is set to a gas pressure, which is the same as or higher than that of the first layer, for the second layer and succeeding layers.

For example, in one embodiment, an intermediate layer is composed of consecutive three layers. As shown in FIG. 2, in this case, an Ru layer is used as the first layer deposited at a low gas pressure. An Ru-oxygen/oxide layer in which oxygen or an oxide is added to Ru is used as the second layer deposited at a high gas pressure. Similarly, an Ru-oxygen/oxide layer in which oxygen or an oxide is added to Ru is also used as the third layer deposited at a high gas pressure. Herein, the oxygen content of the third layer is set to the desired content so that an improvement in separation properties can be sufficiently achieved. The oxygen content of the second layer is set to the oxygen content which is lower than that of the third layer, for example, intermediate content of the oxygen content of third layer. In the present invention, it is suitable that the intermediate layer is composed of consecutive N layers (provided that N is an integer of at least 3 or more), the oxygen content of N layers is adjusted within a range from 0 ppm by weight to 20,000 ppm by weight, and the oxygen content of the (N−a+1)th layer (provided that "a" is an integer of 1 to (N−2)) is adjusted so that the oxygen content is the same as or higher than that of the (N−a)th layer. In the above embodiment, specifically, it is suitable that the oxygen content of the second layer is adjusted, for example, within a range from 1,000 ppm by weight to 4,000 ppm by weight, and the oxygen content of the third layer is adjusted within a range from 2,000 ppm by weight to 8,000 ppm by weight. It is possible to adjust so that the oxygen content in the deposited layer increases toward the uppermost layer by increasing the oxygen or oxide content from the lower layer toward the upper layer.

There is no need of particular restriction on the thickness of the intermediate layer in the present invention. The thickness is desirably set to the minimum thickness required to control the structure of a perpendicular magnetic recording layer and, for example, the entire thickness is appropriately set within a range from about 15 nm to 30 nm. It is suitable that the thickness of the first layer deposited at a low gas pressure, among the intermediate layer, is adjusted within a range from 4 to 14 nm, and the thicknesses of the second layer and third layer (and succeeding layers) deposited at a high gas pressure are respectively adjusted within a range from 4 to 8 nm.

The soft magnetic layer is preferably provided on the substrate so as to appropriately adjust a magnetic circuit of the perpendicular magnetic recording layer. Such a soft magnetic layer is preferably composed of a first soft magnetic layer, a second soft magnetic layer, and a non-magnetic spacer layer intervening in between the first and second soft magnetic layers to thus achieve antiferro-magnetic exchange coupling (AFC). Thus, the magnetization directions of the first soft magnetic layer and of the second soft magnetic layer can be set anti-parallel to each other with high accuracy, which can reduce noise generated from the soft magnetic layer. Specifically, a suitable composition for each of the first soft magnetic layer and the second soft magnetic layer can be, for example, CoTaZr (cobalt-tantalum-zirconium), CoFeTaZr (cobalt-iron-tantalum-zirconium), or CoFeTaZrAl (cobalt-iron-tantalum-zirconium-aluminum). A suitable composition for the spacer layer can be, for example, Ru (ruthenium).

The thickness of the soft magnetic layer varies depending on the structure of the soft magnetic layer, and the structure and characteristics of the magnetic head, and is preferably in a range of 15 to 100 nm in total. The thicknesses of the upper and lower layers may be slightly different from each other from the viewpoint of optimizing the recording and reproducing operations, but are desirably substantially equal to each other.

The adhesive layer is preferably formed between the substrate and the soft magnetic layer. The formation of adhesive layer can improve adhesion between the substrate and the soft magnetic layer to prevent peeling of the soft magnetic layer. The adhesive layer can be formed using, for example, a Ti-containing material.

The seed layer is used for controlling the orientation and crystallinity of the intermediate layer. When all layers are continuously deposited, the seed layer is not necessary in some cases. The crystal growth would be degraded due to compatibility between the soft magnetic layer and the intermediate layer. Therefore, the use of the seed layer can prevent the degradation of the crystal growth of the intermediate layer. The thickness of the seed layer is desirably set to the minimum thickness required to control the crystal growth of the intermediate layer. The excessively thick seed layer reduces the writing capacity of signals.

Examples of the glass for the substrate include aluminosilicate glass, aluminoborosilicate glass, soda-lime glass, and the like. Among them, aluminosilicate glass is preferable. Further, amorphous glass or crystal glass can be used for the formation of the substrate. The use of a chemically hardened glass preferably enhances the toughness of the substrate. In the present invention, the surface roughness of the main surface of the substrate is preferably as follows: Rmax is 10 nm or less, and Ra is 0.3 nm or less.

The perpendicular magnetic recording layer preferably includes a ferromagnetic layer having a granular structure which includes crystal particles mainly containing cobalt (Co), and a boundary part mainly containing Si, Ti, Cr, Co, or an oxide of Si, Ti, Cr, or Co.

Specifically, a Co-based magnetic material for forming the above ferromagnetic layer is desirably material for molding a hcp crystal structure using a hard magnetic target composed of CoCrPt (cobalt-chrome-platinum) containing silicon oxide, titanium oxide (TiO2) or the like which is a non-magnetic material. The thickness of the ferromagnetic layer is preferably, for example, 20 nm or less.

An auxiliary recording layer can be provided above the perpendicular magnetic recording layer via an exchange-coupling control layer to achieve the high heat resistance in addition to the high recording density and the low noise of the magnetic recording layer. The composition of auxiliary recording layer can be, for example, CoCrPtB or the like.

The exchange-coupling control layer is preferably formed between the perpendicular magnetic recording layer and the auxiliary recording layer. The provision of the exchange-coupling control layer can suitably control the strength of exchange-coupling between the perpendicular magnetic recording layer and the auxiliary recording layer to optimize the recording and reproducing characteristics. The exchange-coupling control layer is preferably formed, for example, using Ru and the like.

A formation method of the perpendicular magnetic recording layer including the ferromagnetic layer is preferably deposited by sputtering. In particular, the use of a DC magnetron sputtering method is preferable because it enables the uniform deposition.

Preferably, the protective layer is provided on the perpendicular magnetic recording layer. The provision of the protective layer can protect the surface of the magnetic disk from the magnetic head floating above the magnetic recording medium. The protective layer is preferably formed of, for example, a carbon-based protective layer. Preferably, the thickness of the protective layer is in a range of about 3 to 7 nm.

Further, a lubricating layer is preferably provided on the protective layer. The provision of the lubricating layer can prevent abrasion between the magnetic head and the magnetic disk to improve the durability of the magnetic disk. Suitable material for the lubricating layer is, for example, a perfluoropolyether (PFPE)-based compound. The lubricating layer can be formed, for example, by a dip coat method.

EXAMPLES

Embodiments of the present invention will be further specifically described below by way of Examples and Comparative Examples.

Example 1

As shown in FIG. 1, an adhesive layer 2, a soft magnetic layer 3, a seed layer 4, an intermediate layer 5, a perpendicular magnetic recording layer 6, a protective layer 7 and a lubricating layer 8 were deposited on a substrate 1 in that order to produce a perpendicular magnetic recording medium of Example 1. Description is made in detail below.

An amorphous aluminosilicate glass was molded into a disk shape by direct press to produce a glass disk. The glass disk was cut, polished, and chemically hardened in this order, whereby a flat non-magnetic glass substrate formed of the chemically hardened glass disk was obtained. The diameter of the disk was 65 mm. The surface roughness of the main surface of the glass substrate 1 was measured by an atomic force microscope (AFM) to obtain the following result: Rmax was 2.18 nm, and Ra was 0.18 nm. The thus-obtained substrate was found to have a flat surface. The Rmax and Ra were measured in accordance to Japanese Industrial Standards (JIS).

Then, an adhesive layer 2, a soft magnetic layer 3, a seed layer 4, an intermediate layer 5, a perpendicular magnetic recording layer 6, and a protective layer 7 were deposited on the glass substrate 1 in that order by a DC magnetron sputtering method using a cluster type stationary facing sputtering device.

Numeral values in the description about the following respective materials indicate the respective compositions.

First, a Cr-50Ti layer was deposited as an adhesive layer 2 in the thickness of 10 nm. Then, a laminated film of two soft magnetic layers antiferromagnetically exchange-coupled via the non-magnetic layer was deposited as the soft magnetic layer 3. That is, first, a (30Fe-70Co)-3Ta5Zr layer was deposited in a thickness of 25 nm as the first soft magnetic layer. Then, an Ru layer was deposited in a thickness of 0.7 nm as the non-magnetic layer. Further, another (30Fe-70Co)-3Ta5Zr layer, which was formed of the same material as the first soft magnetic layer, was deposited in a thickness of 25 nm as the second soft magnetic layer.

Subsequently, a NiW layer was deposited in a thickness of 5 nm on the soft magnetic layer 3 as the seed layer 4.

Then, three-layered Ru layer was deposited as an intermediate layer 5. That is, Ru (Ru elementary substance) was deposited as the first layer at an Ar gas pressure of 0.7 Pa and oxide-containing Ru was deposited as the second layer at an Ar gas pressure of 4.5 Pa, and then oxide-containing Ru was deposited as the third layer at the same Ar gas pressure of 4.5 Pa. The deposition process of this intermediate layer is described in detail below. That is, first, Ru was deposited as the first layer in a thickness of 10 nm by adjusting an Ar gas pressure to 0.7 Pa using an Ru target. Then, Ru—SiO2 was deposited as the second layer in a thickness of 6 nm by adjusting an Ar gas pressure to 4.5 Pa using an Ru—SiO2 (SiO2 (containing 2,000 ppm by weight of oxygen) target. Subsequently, Ru—SiO2 was deposited as the third layer in a thickness of 6 nm by adjusting an Ar gas pressure to 4.5 Pa using an Ru—SiO2 (SiO2 (containing 4,000 ppm by weight of oxygen) target.

Then, the perpendicular magnetic recording layer 6 was deposited on the intermediate layer 5. First, 90(Co-10Cr-16Pt)-5SiO2-5TiO2 was deposited in a thickness of 10 nm as the perpendicular magnetic recording layer. Then, an Ru layer was deposited in a thickness of 0.3 nm as the exchange-coupling control layer, and further Co-18Cr-15Pt-5B was deposited thereon in a thickness of 7 nm as auxiliary recording layer.

Thereafter, a carbon-based protective layer 7 composed of a hydrogenated diamond-like carbon was formed on the perpendicular magnetic recording layer 6. The thickness of the carbon-based protective layer 7 was set to 5 nm.

Subsequently, the substrate was removed from the sputtering device, and then a lubricating layer 8 made of PFPE (perfluoropolyether) was formed by the dip coat method. The thickness of the lubricating layer 8 was set to 1 nm.

By the above manufacturing steps, the perpendicular magnetic recording medium of Example 1 was obtained.

Example 2

In the deposition step of the intermediate layer in Example 1, Ru was deposited as the first layer in a thickness of 10 nm by adjusting an Ar gas pressure to 0.7 Pa in the very same manner as in Example 1. Then, Ru—SiO2 was deposited as the second layer in a thickness of 6 nm by adjusting an Ar gas pressure to 4.5 Pa using an Ru—SiO2 (SiO2 (containing 4,000 ppm by weight of oxygen) target. Subsequently, Ru—SiO2 was deposited as the third layer in a thickness of 6 nm by adjusting an Ar gas pressure to 4.5 Pa using an Ru—SiO2 (SiO2 (containing 8,000 ppm by weight of oxygen) target.

In the same manner as in Example 1, except for changing the deposition of the intermediate layer as described above, a perpendicular magnetic recording medium of Example 2 was obtained.

Example 3

In the deposition step of the intermediate layer in Example 1, Ru was deposited as the first layer in a thickness of 10 nm by adjusting an Ar gas pressure to 0.7 Pa in the very same manner as in Example 1. Then, Ru was deposited as the second layer in a thickness of 6 nm by adjusting an Ar gas pressure to 4.5 Pa and performing Ar (99.5%)+oxygen (0.5%) reactive sputtering using an Ru target. Subsequently, Ru—SiO2 was deposited as the third layer in a thickness of 6 nm by adjusting an Ar gas pressure to 4.5 Pa using an Ru—SiO2 (SiO2 (containing 4,000 ppm by weight of oxygen) target. In the same manner as in Example 1, except for changing the deposition of the intermediate layer as described above, a perpendicular magnetic recording medium of Example 3 was obtained.

It is recognized that the obtained perpendicular magnetic recording medium exhibits the same characteristics as in oxygen reactive sputtering even in case of using a target of Ru containing oxygen under deposition conditions of exposure to oxygen.

Example 4

In the deposition step of the intermediate layer in Example 1, Ru was deposited as the first layer in a thickness of 10 nm by adjusting an Ar gas pressure to 0.7 Pa in the very same manner as in Example 1. Then, Ru—TiO2 was deposited as the second layer in a thickness of 6 nm by adjusting a gas pressure to 4.5 Pa using an Ru—TiO2 (TiO2 (containing 4,000 ppm by weight of oxygen) target. Subsequently, Ru—TiO2 was deposited as the third layer in a thickness of 6 nm by adjusting an Ar gas pressure to 4.5 Pa using an Ru—TiO2 (TiO2 (containing 8,000 ppm by weight of oxygen) target.

In the same manner as in Example 1, except for changing the deposition of the intermediate layer as described above, a perpendicular magnetic recording medium of Example 4 was obtained.

Example 5

In the deposition step of the intermediate layer in Example 1, Ru was deposited as the first layer in a thickness of 10 nm by adjusting an Ar gas pressure to 0.7 Pa in the very same manner as in Example 1. Then, Ru—SiO2 was deposited as the second layer in a thickness of 6 nm by adjusting an Ar gas pressure to 4.5 Pa using an Ru—SiO2 (SiO2 (containing 4,000 ppm by weight of oxygen) target. Subsequently, Ru—TiO2 was deposited as the third layer in a thickness of 6 nm by adjusting an Ar gas pressure to 4.5 Pa using an Ru—TiO2 (TiO2 (containing 8,000 ppm by weight of oxygen) target.

In the same manner as in Example 1, except for changing the deposition of the intermediate layer as described above, a perpendicular magnetic recording medium of Example 5 was obtained.

Example 6

In the deposition step of the intermediate layer in Example 1, Ru was deposited as the first layer in a thickness of 10 nm by adjusting an Ar gas pressure to 0.7 Pa in the very same manner as in Example 1. Then, Ru was deposited as the second layer in a thickness of 6 nm by adjusting an Ar gas pressure to 4.5 Pa using an Ru target. Subsequently, Ru—SiO2 was deposited as the third layer in a thickness of 6 nm by adjusting an Ar gas pressure to 4.5 Pa using an Ru—SiO2 (SiO2 (containing 2,000 ppm by weight of oxygen) target.

In the same manner as in Example 1, except for changing the deposition of the intermediate layer as described above, a perpendicular magnetic recording medium of Example 6 was obtained.

Example 7

In the deposition step of the intermediate layer in Example 1, Ru—SiO2 was deposited as the first layer in a thickness of 10 nm by adjusting an Ar gas pressure to 0.7 Pa using an Ru—SiO2 (SiO2 (containing 2,000 ppm by weight of oxygen) target. Then, Ru—SiO2 was deposited as the second layer in a thickness of 6 nm by adjusting an Ar gas pressure to 4.5 Pa using an Ru—SiO2 (SiO2 (containing 2,000 ppm by weight of oxygen) target. Subsequently, Ru—SiO2 was deposited as the third layer in a thickness of 6 nm by adjusting an Ar gas pressure to 4.5 Pa using an Ru—SiO2 (SiO2 (containing 4,000 ppm by weight of oxygen) target.

In the same manner as in Example 1, except for changing the deposition of the intermediate layer as described above, a perpendicular magnetic recording medium of Example 7 was obtained.

Example 8

In the deposition step of the intermediate layer in Example 1, Ru was deposited as the first layer in a thickness of 10 nm by adjusting an Ar gas pressure to 0.7 Pa in the very same manner as in Example 1. Then, Ru—SiO2 was deposited as the second layer in a thickness of 6 nm by adjusting an Ar gas pressure to 0.7 Pa using an Ru—SiO2 (SiO2 (containing 2,000 ppm by weight of oxygen) target. Subsequently, Ru—SiO2 was deposited as the third layer in a thickness of 6 nm by adjusting an Ar gas pressure to 4.5 Pa using an Ru—SiO2 (SiO2 (containing 4,000 ppm by weight of oxygen) target.

In the same manner as in Example 1, except for changing the deposition of the intermediate layer as described above, a perpendicular magnetic recording medium of Example 8 was obtained.

Example 9

In the deposition step of the intermediate layer in Example 1, Ru was deposited as the first layer in a thickness of 10 nm by adjusting an Ar gas pressure to 0.7 Pa in the very same manner as in Example 1. Then, Ru was deposited as the second layer in a thickness of 6 nm by adjusting an Ar gas pressure to 0.7 Pa using an Ru target. Subsequently, Ru—SiO2 was deposited as the third layer in a thickness of 6 nm by adjusting an Ar gas pressure to 4.5 Pa using an Ru—SiO2 (SiO2 (containing 2,000 ppm by weight of oxygen) target.

In the same manner as in Example 1, except for changing the deposition of the intermediate layer as described above, a perpendicular magnetic recording medium of Example 9 was obtained.

Example 10

In the deposition step of the intermediate layer in Example 1, Ru was deposited as the first layer in a thickness of 10 nm by adjusting an Ar gas pressure to 0.7 Pa in the very same manner as in Example 1. Then, Ru—SiO2 was deposited as the second layer in a thickness of 2 nm by adjusting an Ar gas pressure to 1.5 Pa using an Ru—SiO2 (SiO2 (containing 2,000 ppm by weight of oxygen) target. Subsequently, Ru—SiO2 was deposited as the third layer in a thickness of 2 nm by adjusting an Ar gas pressure to 4.5 Pa using an Ru—SiO2 (SiO2 (containing 4,000 ppm by weight of oxygen) target. Subsequently, Ru—SiO2 was deposited as the fourth layer in a thickness of 2 nm by adjusting an Ar gas pressure to 4.5 Pa using an Ru—SiO2 (SiO2 (containing 6,000 ppm by weight of oxygen) target.

In the same manner as in Example 1, except for changing the deposition of the intermediate layer as described above, a perpendicular magnetic recording medium of Example 10 was obtained.

Example 11

In the deposition step of the intermediate layer in Example 1, Ru was deposited as the first layer in a thickness of 10 nm by adjusting an Ar gas pressure to 0.7 Pa in the very same manner as in Example 1. Then, Ru—TiO2 was deposited as the second layer in a thickness of 2 nm by adjusting an Ar gas pressure to 4.5 Pa using an Ru—TiO2 (TiO2 (containing 2,000 ppm by weight of oxygen) target. Subsequently, Ru—SiO2 was deposited as the third layer in a thickness of 2 nm by adjusting an Ar gas pressure to 4.5 Pa using an Ru—SiO2 (SiO2 (containing 4,000 ppm by weight of oxygen) target. Subsequently, Ru—TiO2 was deposited as the fourth layer in a thickness of 2 nm by adjusting an Ar gas pressure to 6.0 Pa using an Ru—TiO2 (TiO2 (containing 8,000 ppm by weight of oxygen) target.

In the same manner as in Example 1, except for changing the deposition of the intermediate layer as described above, a perpendicular magnetic recording medium of Example 11 was obtained.

Example 12

In the deposition step of the intermediate layer in Example 1, Ru was deposited as the first layer in a thickness of 10 nm by adjusting an Ar gas pressure to 0.7 Pa in the very same manner as in Example 1. Then, Ru—SiO2 was deposited as the second layer in a thickness of 6 nm by adjusting an Ar gas pressure to 4.5 Pa using an Ru—SiO2 (SiO2 (containing 10,000 ppm by weight of oxygen) target. Subsequently, Ru—SiO2 was deposited as the third layer in a thickness of 6 nm by adjusting an Ar gas pressure to 4.5 Pa using an Ru—SiO2 (SiO2 (containing 20,000 ppm by weight of oxygen) target.

In the same manner as in Example 1, except for changing the deposition of the intermediate layer as described above, a perpendicular magnetic recording medium of Example 12 was obtained.

Comparative Example 1

A two-layered Ru layer was deposited as the intermediate layer 5. That is, first, Ru was deposited as the first layer in a thickness of 10 nm by adjusting an Ar gas pressure to 0.7 Pa using an Ru target. Then, Ru—SiO2 was deposited as the second layer in a thickness of 12 nm by adjusting an Ar gas pressure to 4.5 Pa using an Ru—SiO2 (SiO2 (containing 4,000 ppm by weight of oxygen) target.

In the same manner as in Example 1, except for changing the deposition of the intermediate layer as described above, a perpendicular magnetic recording medium of Comparative Example 1 was obtained.

Comparative Example 2

In the deposition step of the intermediate layer in Example 1, Ru was deposited as the first layer in a thickness of 10 nm by adjusting an Ar gas pressure to 0.7 Pa in the very same manner as in Example 1. Then, Ru—SiO2 was deposited as the second layer in a thickness of 6 nm by adjusting an Ar gas pressure to 4.5 Pa using an Ru—SiO2 (SiO2 (containing 8,000 ppm by weight of oxygen) target. Subsequently, Ru—SiO2 was deposited as the third layer in a thickness of 6 nm by adjusting an Ar gas pressure to 4.5 Pa using an Ru—SiO2 (SiO2 (containing 4,000 ppm by weight of oxygen) target.

In the same manner as in Example 1, except for changing the deposition of the intermediate layer as described above, a perpendicular magnetic recording medium of Comparative Example 2 was obtained.

Comparative Example 3

In the deposition step of the intermediate layer in Example 1, Ru was deposited as the first layer in a thickness of 10 nm by adjusting an Ar gas pressure to 0.7 Pa in the very same manner as in Example 1. Then, Ru—SiO2 was deposited as the second layer in a thickness of 6 nm by adjusting an Ar gas pressure to 4.5 Pa using an Ru—SiO2 (SiO2 (containing 10,000 ppm by weight of oxygen) target. Subsequently, Ru—SiO2 was deposited as the third layer in a thickness of 6 nm by adjusting an Ar gas pressure to 4.5 Pa using an Ru—SiO2 (SiO2 (containing 24,000 ppm by weight of oxygen) target.

In the same manner as in Example 1, except for changing the deposition of the intermediate layer as described above, a perpendicular magnetic recording medium of Comparative Example 3 was obtained.

Evaluation

The following evaluation was performed using the perpendicular magnetic recording media of Examples and Comparative Examples described above.

The degree of orientation of an Ru crystal of the first layer of an intermediate layer in each perpendicular magnetic recording medium was measured by an X-ray diffractometer. The results are shown in the following Table 1. The smaller $\Delta\theta 50$ value (unit is "degree"), as an indicator of orientation dispersion in a direction perpendicular to a surface of Ru crystal particles, shows that crystal orientation is more suitably controlled.

The evaluation of the recording and reproducing characteristics of each perpendicular magnetic recording medium was performed by measuring a MWW (track width) and a bit error (described as "bER" in Table 1) at a linear recording density of 1,500 kFCI (Kilo Flux Change per inch) using a spin-stand tester including a SPT/TMR head.

Using an R/W analyzer and the magnetic head for the perpendicular magnetic recording system, the squash and an S/N ratio (signal/noise ratio) were measured. The squash serves as an indicator for evaluation of a rate of decrease in signal due to the influence given by adjacent track. Specifically, signal is written at a certain set frequency (Data Track) and the Track profile was measured, and then Max-TAA (signal output intensity) is recorded. Adjacent Tack is written from Center of Data Track to ±SqueesePosition. After transfer to the position of Center (Max TAA) of Data Track, the TAAsquash (TAA) is measured. Usually, it becomes the value smaller than MaxTAA due to the influence of Adjacent Track. Squash=TAAsquash/MaxTAA. The larger value shows lesser decrease in signal due to the influence from Adjacent Tack.

The obtained results are shown collectively in the following Table 1.

TABLE 1

Table 1

|  | Δθ50 (degree) | MWW (nm) | Squash (%) | S/N (dB) | bER 10× |
|---|---|---|---|---|---|
| Example 1 | 2.0 | 92 | 89.5 | 19.0 | −6.2 |
| Example 2 | 2.1 | 97 | 89.0 | 18.5 | −6.2 |
| Example 3 | 1.9 | 94 | 88.3 | 19.2 | −6.1 |
| Example 4 | 2.0 | 92 | 90.0 | 19.1 | −6.4 |
| Example 5 | 2.3 | 96 | 88.7 | 18.3 | −6.1 |
| Example 6 | 2.0 | 95 | 88.0 | 18.1 | −6.0 |
| Example 7 | 2.2 | 94 | 89.0 | 18.7 | −6.1 |
| Example 8 | 2.1 | 92 | 88.0 | 18.6 | −6.2 |
| Example 9 | 2.3 | 94 | 90.1 | 18.4 | −6.1 |
| Example 10 | 2.1 | 93 | 90.2 | 18.7 | −6.3 |
| Example 11 | 2.0 | 92 | 90.0 | 18.8 | −6.2 |
| Example 12 | 2.3 | 95 | 89.0 | 18.0 | −6.0 |
| Comparative Example 1 | 2.5 | 99 | 87.0 | 17.8 | −5.6 |
| Comparative Example 2 | 2.8 | 100 | 85.5 | 17.6 | −5.5 |
| Comparative Example 3 | 2.5 | 98 | 86.0 | 17.6 | −5.7 |

From the results shown in Table 1, the following can be confirmed. That is, the perpendicular magnetic recording media of Examples of the present invention have satisfactory orientation of the intermediate layer and also have satisfactory recording and reproducing characteristics of the medium as compared with Comparative Examples, and thus, the perpendicular magnetic recording media can obtain characteristics capable of coping with the much higher recording density.

In contrast, it is apparent that both the perpendicular magnetic recording media of Comparative Example 1 (Conventional Example) and Comparative Example 2 are inferior in orientation as well as medium recording and reproducing characteristics as compared with Examples, and thus, the perpendicular magnetic recording media cannot obtain desired characteristics for a magnetic recording medium having higher recording density.

| Reference Signs List | |
|---|---|
| 1: | Substrate |
| 2: | Adhesive layer |
| 3: | Soft magnetic layer |
| 4: | Seed layer |
| 5: | Intermediate layer |
| 6: | Perpendicular magnetic recording layer |
| 7: | Protective layer |
| 8: | Lubricating layer |

The invention claimed is:

1. A method for manufacturing a perpendicular magnetic recording medium to be used for recording information by a perpendicular magnetic recording system, comprising on a substrate and in the order from the bottom, at least a soft magnetic layer, an intermediate layer composed of consecutive N layers, where N is an integer of 3 or more, and a magnetic recording layer, characterized in that the method comprises the steps of:

forming the intermediate layer of consecutive N layers by:
first depositing a first layer containing ruthenium (Ru) as a main component at a first gas pressure;
depositing on the first layer a second layer containing, as a main component, ruthenium (Ru) containing oxygen or Ru containing an oxide at a second gas pressure that is higher than the first gas pressure;
depositing on the second layer a third layer containing, as a main component, ruthenium (Ru) containing oxygen or Ru containing an oxide, wherein the third layer has an oxygen content that is higher than that of the second layer; and
when N is an integer more than 3, depositing on the third layer one or more succeeding layers each containing, as a main component, ruthenium (Ru) containing oxygen or Ru containing an oxide, such that the intermediate layer has an increasing oxygen content towards the magnetic recording layer.

2. The method for manufacturing a perpendicular magnetic recording medium according to claim 1, wherein the oxygen content of each of the consecutive N layers is adjusted within a range from 0 ppm by weight to 20,000 ppm by weight.

3. The method for manufacturing a perpendicular magnetic recording medium according to claim 1, wherein each of the oxides in the second layer, the third layer and the one or more succeeding layers contains a Si, Ti, Cr, Co, W, Ta, Al, Mg, Fe, Pd, Au, Mo, Zr or Pb material.

4. The method for manufacturing a perpendicular magnetic recording medium according to claim 1, wherein the magnetic recording layer includes a ferromagnetic layer having a granular structure which includes crystal particles mainly containing cobalt (Co), and a boundary part mainly containing an oxide.

5. The method for manufacturing a perpendicular magnetic recording medium according to claim 1, wherein a carbon-based protective layer is formed on the magnetic recording layer.

6. The method for manufacturing a perpendicular magnetic recording medium according to claim 1, wherein the oxygen content of the second layer of the intermediate layer is adjusted to within a range of 1,000 ppm by weight to 4,000 ppm by weight, and the oxygen content of the third layer of the intermediate layer is adjusted to within a range of 2,000 ppm by weight to 8,000 ppm by weight.

7. The method for manufacturing a perpendicular magnetic recording medium according to claim 1, wherein the first gas pressure is from 0.3 to 15 Pa.

* * * * *